(12) United States Patent
Szczesniewski et al.

(10) Patent No.: US 6,358,870 B1
(45) Date of Patent: Mar. 19, 2002

(54) METHOD FOR PREPARING PRE-REACTED BATCHES OF RAW MATERIALS FOR THE PRODUCTION OF GLASS FORMULAS

(75) Inventors: Antonio Pita Szczesniewski; Hugo Bolio Arceo, both of Nuevo León (MX)

(73) Assignee: Vitro Corporativo, S.A. DE C.V., Garza Garcia (MX)

( * ) Notice: Subject to any disclaimer, the term of this patent is extended or adjusted under 35 U.S.C. 154(b) by 0 days.

(21) Appl. No.: 09/307,338

(22) Filed: May 3, 1999

(51) Int. Cl.[7] .............................. C03C 6/00; C03C 6/04
(52) U.S. Cl. ........................................ 501/27; 501/31
(58) Field of Search ........................ 501/27, 31

(56) References Cited

U.S. PATENT DOCUMENTS

| | | | |
|---|---|---|---|
| 3,082,102 A | | 3/1963 | Cole et al. |
| 3,726,697 A | * | 4/1973 | Mod et al. |
| 3,929,439 A | * | 12/1975 | Pierce ............... 501/27 |
| 4,142,907 A | * | 3/1979 | Manring et al. ............... 501/27 |
| 4,341,566 A | * | 7/1982 | Barrett et al. ............... 501/27 |
| 4,920,080 A | | 4/1990 | Demarest, Jr. ............... 501/31 |
| 5,004,706 A | * | 4/1991 | Dickinson ............... 501/27 |

OTHER PUBLICATIONS

"Phase Equilibria in the Glass Forming Region of System $Na_2O-CaO-MgO-SiO_2$", K.A. Shahid & F.P. Glasser, *Physics and Chemistry of Glasses*, vol. 13, No. 2, (Apr. 1972).

"High $SiO_2$ Corner of System $Na_2O-CaO-SiO_2$", G.W. Morey and N.L. Bowen, *Journal Soc. Glass Technol.*, 9, pp. 232, 233 (1925) (No Month).

* cited by examiner

Primary Examiner—David Sample
(74) Attorney, Agent, or Firm—Abelman, Frayne & Schwab

(57) ABSTRACT

A method for preparing pre-reacted batches of raw materials substantially free from carbon dioxide for the production of glass formulas, comprising: mixing stoichiometric amounts of substances containing molecular systems of silica-sodium, silica-sodium-calcium, silica-sodium-magnesium, silica-calcium-magnesium, silica-sodium-calcium-magnesium and mixtures thereof, having reaction temperatures which do not form a liquid phase, which are selected from invariant points or from points on a line connecting invariant points of phase diagrams of said molecular systems, to complete a desired molecular glass formula.

2 Claims, 8 Drawing Sheets

PROFILE TREATMENT TIME IN FURNACE vs FURNACE TEMPERATURE AND % CO2 IN A PRE-REACTED SAMPLE
SYSTEM NSBK-6
MATERIAL: 1N: 0.9S

METHOD FOR PREPARING PRE-REACTED BATCHES OF RAW MATERIALS FOR THE PRODUCTION OF GLASS FORMULAS

BACKGROUND OF THE INVENTION

1. Field of the Invention

This invention relates to batches of raw materials for preparing glass and more specifically to a method for preparing pre reacted batches of raw materials which are substantially free from gaseous carbon dioxide for the production of glass formulas.

2. Description of the Related Art

The batches for preparing molten glass have been provided, since many years, by feeding independent glass components typically silica, sodium carbonate, calcium carbonate, borates, feldspar, dolomite, kaolin, etc., in proportions according to a desired glass formulation, to a melting furnace at temperatures ranging between 1400° C. to 1600° C.

These typical batches include raw materials having different melting points and reacting at different temperatures under different operating conditions.

During the melting process of the raw materials, many different reactions take place in the glass melting furnace producing gaseous emissions in the form of bubbles which create the need for establishing a refining and conditioning zone for the molten glass mass in the furnace which, in turn, results in a limitation of the residence time of the molten mass, resulting in high melting temperatures and the need to carefully control environmental emission restrictions.

Additionally, because of the high temperatures and corrosive nature of the diverse types of reactions taking place in the melting furnace, the life of the melting furnace is always an important issue.

U.S. Pat. No 3,082,102 issued to Cole et al, discloses a process for producing molten glass by maintaining the glass batch at a temperature and for a time sufficient to complete chemical reaction between component particles while the batch as a whole remains in solid state at the completion of the fraction, before subjecting the embryo glass so formed to a temperature high enough to melt the embryo glass.

U.S. Pat. No 4,920,080 issued to Demarsest, discloses a method for pre-heating and pre-reacting all portions of the batch prior to the melting step, in two separate portions, a first portion of $SiO_2$ with $Na_2CO_3$ in a first pre-reaction zone at sufficient time and temperature to form a product consisting predominantly of sodium silicate, and heating a second portion of $SiO_2$ with $CaCO_3$ in a second pre-reaction zone at sufficient time and temperature to render the calcium source free of carbonates.

It can be concluded from the methods disclosed in the above mentioned patents that efforts have been made to provide pre-reacted raw materials in which gaseous compounds have advantageously been eliminated.

However, the above disclosed methods treat all the batch mixtures at temperatures finely controlled to avoid that the reactions taking place do not form a liquid melting phase because of the danger representing the difficulty of handling a batch including solid and liquid phases.

Applicants have concluded that a batch for the different purposes, mainly for flat glass, container glass (soda-lime and boro-silicate glass), glass fiber, etc., consists of a molecular formula comprising a diverse number of molecules of Si, Na, Ca, Mg, Bo, etc., which can be clearly approximated from natural, substances, partially treated minerals or intermediate products of treated minerals, including molecular systems of Si—Na, Si—Na—Ca, Si—Na—Mf, Si—Ca—Mg, Si—Na—Ca—Mg and mixtures thereof some of which are in the form of already pre-reacted substances and some of which have to be conveniently pre-reacted in a calcining burner and, in either case, they are substantially free from gaseous carbon dioxide.

Furthermore, Applicants have discovered that, if phase diagrams are prepared for the different molecular systems of raw materials, it is possible to select molecular formulas having decomposing and/or melting temperatures well above at least 1000° C. below which not only melting glass or liquid phase is not formed, but also the release of carbon dioxide can be clearly carried out, which are selected from invariant points or from points on a line connecting invariant points of phase diagrams of said molecular systems, and combine them to reach or approach the desired molecular glass formula, completing this by adding pure silica when necessary.

Phase diagrams of the above disclosed nature can be found for example in the papers of K. A. Shahid & F. P. Glosser "Phse equibria un the glass forming region of the system $Na_2O$—$CaO$—$MgO$—$SiO_2$," published in Physics and Chemistry of Glasses Vol. 13 No. 2 April 1972; and of G. W. Morey and N. L. Bowen, "Corner of system $Na_2O$—$CaO$—$SiO_2$," published by the Soc. Glass Technol., 9pp. 232, 233 (1925).

What it is looked for, is to saturate the sodium, calcium and in general all the elements of a glass formula that are handled with raw materials containing $CO_2$, to provide the specific molecular glass formula or at least a best approach of the molecular formula, completing the balance by providing silica sand In this way, it is possible to provide a pre-reacted batch of raw materials for a specific molecular glass formula which:
1. Is greatly stable;
2. Melts faster and better;
3. Does not produce any bubbles due to the decomposition of the $CO_2$ components contained in the traditionally used raw material;
4. Reacts or melts at above 1000° C.
5. Is prepared by heating typical raw materials and reacting them as a solid-solid mixture which is de-carbonated between 840° C. and 870° C:
6. Allows the possibiity of improving the glass quality and/or increasing the production rate and or reducing thermal input as well as reducing temperature conditions in the furnace.
7. Allows the possibility of reducing environmental emissions.
8. Allows the possibility of increasing furnace life and/or reducing the size of the furnace for previously equal throughputs.

SUMMARY OF THE INVENTION

It is therefore a main object of the present invention, to provide a method for preparing pre-reacted batches of raw materials for the production of glass formulas, by providing stoichiometric amounts of substances containing molecular systems of silica-sodium, silica-sodium-calcium, silica-sodium-magnesium, silica-calcium-magnesium, silica-sodium-calcium-magnesium and mixtures thereof having reaction temperatures which do not form a liquid phase, which are selected from invariant points or from points on a line connecting invariant points of phase diagrams of said molecular systems, to complete or approach a desired molecular glass formula.

it is also a main object of the present invention, to provide a method for preparing pre-reacted batches of raw materials for the production of glass formulas, of the above disclosed nature, in which the pre-reacted batches are prepared by heating typical raw materials reacting them as a solids-solids mixture which is de-carbonated between 840° C. and 870° C.

It is still a main object of the present invention, to provide a method for preparing pre-reacted batches of raw materials for the production of glass formulas, of the above disclosed nature, in which the pre-reacted batches are greatly stable, melt faster and better than the typical batches and allow an increase in the production rate.

it is a further main object of the present invention, to provide a method for preparing pre-reacted batches of raw materials for the production of glass formulas, of the above disclosed nature, which allows the possibility of reducing environmental emissions, increasing the furnace life and/or reducing the size of the furnace for previously equal throughputs.

These and other objects and advantages of the method for preparing pre-reacted batches of raw materials for the production of glass formulas, of the present invention will become apparent from the following detailed description of the invention, provided as specific embodiments thereof.

DETAILED DESCRIPTION OF THE INVENTION

Figure 1:
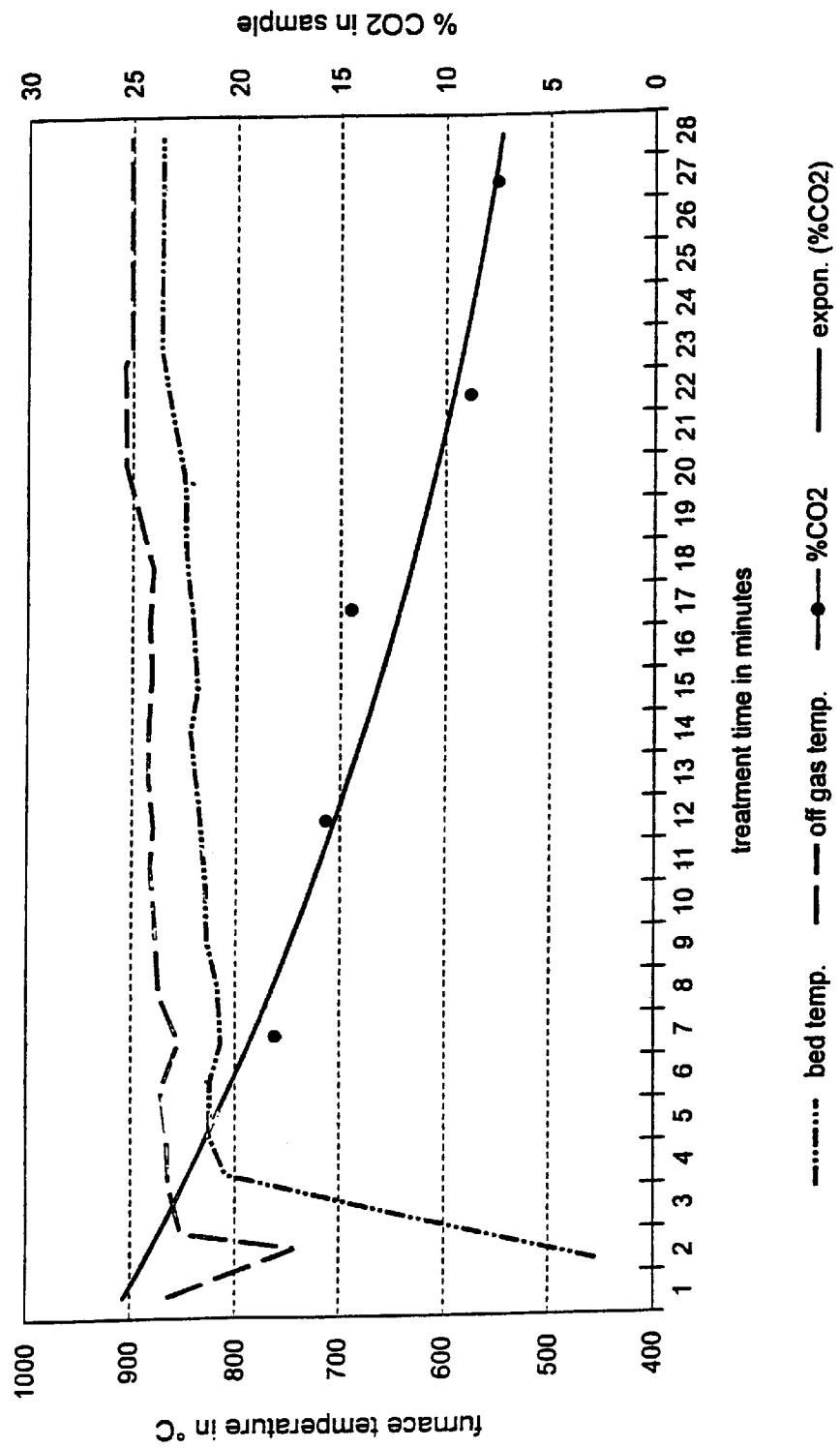
FIGS. 1 through 8 are diagrams of the residence time against the kiln temperature and the $CO_2$ content of the test carried out with the following molecular systems: Na—Ca—5Si; Na—Ca—5SI (foundry silica); Na—Mg—4Si; Na—Mg—4Si (foundry silica); Na—3Ca—6Si; Na—3Ca—6Si (foundry silica); Na—3Ca—6Si (foundry silica); and Na—2Ca—3Si.

In its most general aspect, the method for preparing pre-reacted batches of raw materials for the production of glass formulas, comprising:

mixing stoichiometric amounts of substances selected from natural minerals, partially treated minerals or intermediate products therefrom containing molecular systems of silica-sodium, silica-sodium-calcium, silica-sodium-magnesium, silica-calcium=magnesium, silica-sodium-calcium-magnesium and mixtures thereof having reaction and $CO_2$ release temperatures under 1000° C. Which do not form a liquid phase at such temperatures, which were selected from invariant points or from points on a line connecting invariant points of phase diagrams of said molecular systems, to complete or approach to a desired molecular glass formula.

The selection of the molecular systems from invariant points in the phase diagrams were taken on the basis of the desired molecular glass formula as follows:

| 1. Molecular System Si-Na | SiNa |
|---|---|
| 2. Molecular System Si-Na-Ca | $Si_3Na_2Ca_2$ |
| | $Si_3NaCa_2$ |
| | $Si_6NaCa_3$ |
| | $Si_5NaCa$ |
| 3. Molecular System Si-Na-Mg | $Si_{12}NaMg_5$ |
| | $Si_6NaMg_2$ |
| | $Si_4NaMg$ |
| | $Si_6NaMg$ |

For a molecular flat glass formula comprising $Si_{73}Na_{15}Ca_9Mg_4$, the molecular systems selected were:

$4(Si_4NaMg)$ = 16Si-4Na-4Mg; $\quad$ $4(Si_6NaMg)$ = 24Si-4Na-4Mg $3(Si_6NaCa_3)$ = 18Si-3Na-9Ca $\quad$ $3(Si_6NaCa_3)$ = 18Si-3Na-9Ca $8(SiNa)$ = 8Si-8Na $\quad\quad\quad\quad\quad$ $8(SiNa)$ = 8Si-8Na $\quad\quad\quad\quad\quad$ 42Si-15Na-4Mg-9Ca $\quad\quad\quad$ 54Si-15Na-4Mg-9Ca The balance $\quad$ 31Si $\quad\quad\quad$ The balance $\quad$ 19Si $\quad\quad\quad\quad\quad$ 73Si-15Na-4Mg-9Ca $\quad\quad\quad$ 73Si-15Na-4Mg-9Ca For a molecular silica-lime glass container formula comprising $Si_{73}Na_{15}Ca_6$, the molecular systems selected were:

$3(Si_6NaCa_3)$ = 18Si-3Na-9Ca $\quad$ $9(Si_5NaCa)$ = 45Si-9Na-9Ca $12(SiNa)$ = 12Si-12Na $\quad\quad\quad$ $6(SiNa)$ = 6Si-6Na $\quad\quad\quad\quad\quad$ 30Si-15Na-9Ca $\quad\quad\quad\quad$ 51Si-15Na-9Ca The balance $\quad$ 43Si $\quad\quad\quad$ The balance $\quad$ 22Si $\quad\quad\quad\quad\quad$ 73Si-15Na-9Ca $\quad\quad\quad\quad$ 73Si-15Na-9Ca For the selection of the desired molecular systems, firmly Differential Test Analysis (DTA) and Thermal Gravimetric Analysis were carried out in order to verify that the de-carbonating temperature and the fact that the reaction temperature of the total selected batch were under the melting temperature.

In a second step, tests were conducted in a batch calcining kiln in which 10 different compounds were processed, extracting samples of each compound every 5 minutes analyzing the $CO_2$ content of half of the samples and analyzing the characteristic of the other half of the samples by means of an X ray diffraction apparatus and, from the results, the 3 most important compounds for the glass formulations were selected.

In a third step, tests were conducted in a pilot calcining kiln, producing 2 tons of pre-decomposed and pre-reacted compounds during 48 hours, extracting samples each 30 minutes, analizing the $CO_2$ content of a half of the samples and analyzing the characteristics of the other half of samples by means of an X ray diffraction apparatus.

An last but not least, in a fourth step, industrial tests were carried out by producing 850 tons of a soda-lime-magnesium compounds in an industrial rotary kiln mixing it with the balancing raw materials required to form a glass batch formula and introducing the same in a 110 tons per day glass furnace without increasing the production rate, the following results were obtained during a test that run continuously for 11 days:

|  | TYPICAL | INVENTION | DIFFERENCE |
|---|---|---|---|
| THERMS | 92 | 77 | 15 |
| CROWN TEPERATURE | 1,470° C. | 1,420° C. | 50° C. |
| GLASS TEPERATURE (AT THE FURNACE EXIT) | 1,170° C. | 1,105° C. | 65° C. |
| PARTICLE EMISSION | 0.04 Kg/Ton | 0.0 Kg/Ton | 0.04 Kg/Ton |
| NOx | 7.12 Kg/Ton | 3.72 Kg/Ton | 3.40 Kg/Ton |

The furnace life was estimated to increase at least one year.

The specific Examples for tests of the second step, extracting samples of each compound every 5 minutes analyzing the $CO_2$ content in the diverse molecular systems for molecular glass formulations, which were respectively plotted in the diagrams of FIGS. 1 to 8, where:

EXAMPLE 1

For a molecular system comprising Na—Ca—5Si three samples were extracted and analyzed, obtaining the following results illustrated in FIG. 1:

| Sample # | Min. | Intial Lecture | Final Lecture | Initial-Final | Factor | % $CaCO_3$ | Factor | % $CO_2$ |
|---|---|---|---|---|---|---|---|---|
| 2 | 5 | 94.4 | 48.2 | 46.2 | 1.1 | 50.82 | 0.43 | 21.85 |
| 4 | 15 | 53.4 | 34.6 | 18.8 | 1.1 | 20.68 | 0.43 | 8.89 |
| 6 | 25 | 56.8 | 44.2 | 12.6 | 1.1 | 13.86 | 0.43 | 5.96 |

EXAMPLE 2

Figure 2:
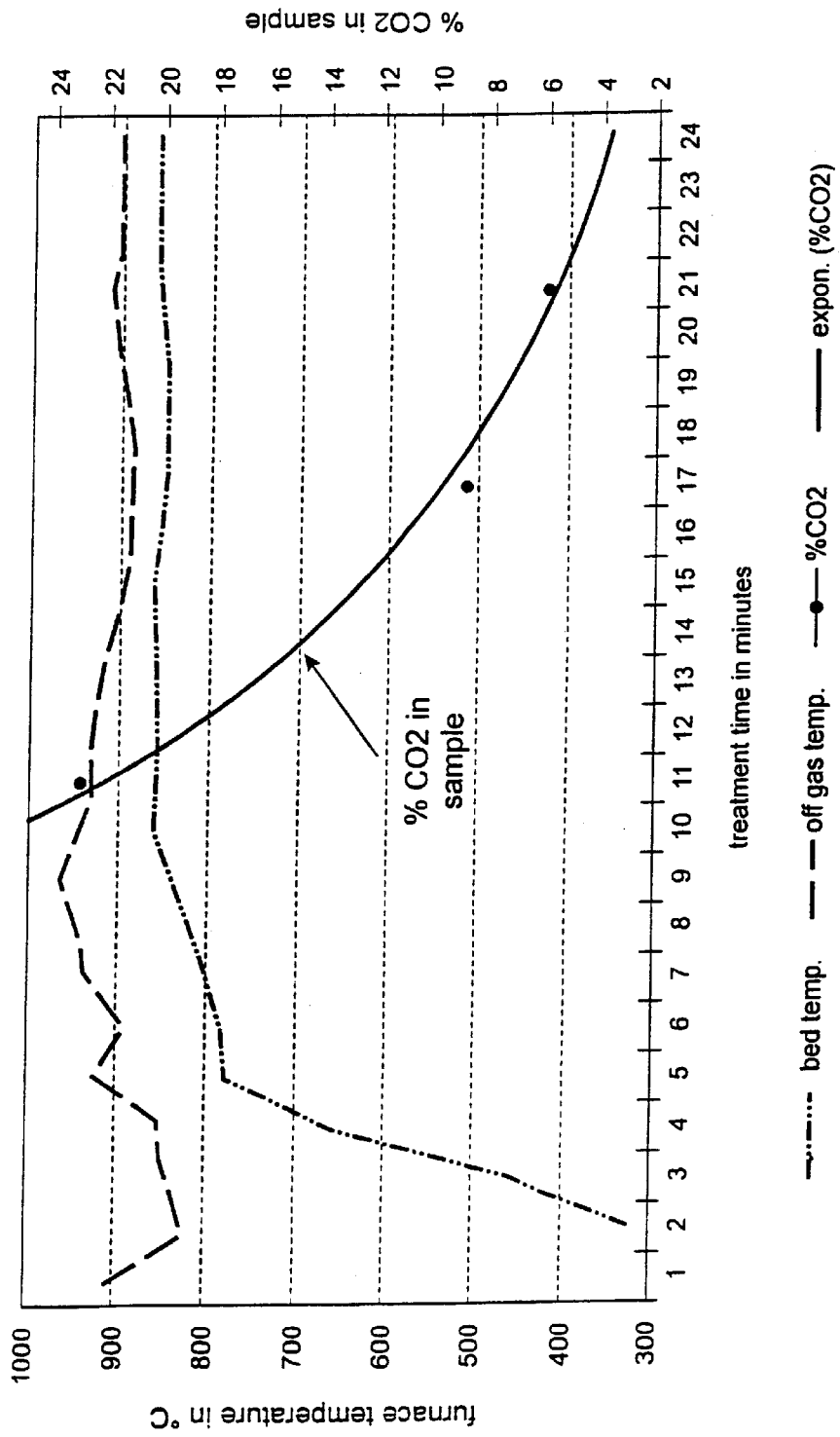

For a molecular system comprising Na—Ca—5Si (foundry silica), four samples were extracted and analyzed, obtaining the following results, illustrated in FIG. 2:

| Sample # | Min. | Initial Lecture | Final Lecture | Initial-Final | Factor | % $CaCO_3$ | Factor | % $CO_2$ |
|---|---|---|---|---|---|---|---|---|
| 2 | 5 | 61.2 | 42.0 | 19.2 | 1.1 | 21.12 | 0.43 | 9.08 |
| 4 | 15 | 56.4 | 47.4 | 9.0 | 1.1 | 9.90 | 0.43 | 4.26 |
| 6 | 25 | 46.0 | 43.2 | 2.8 | 1.1 | 3.08 | 0.43 | 1.32 |

EXAMPLE 3

Figure 3:
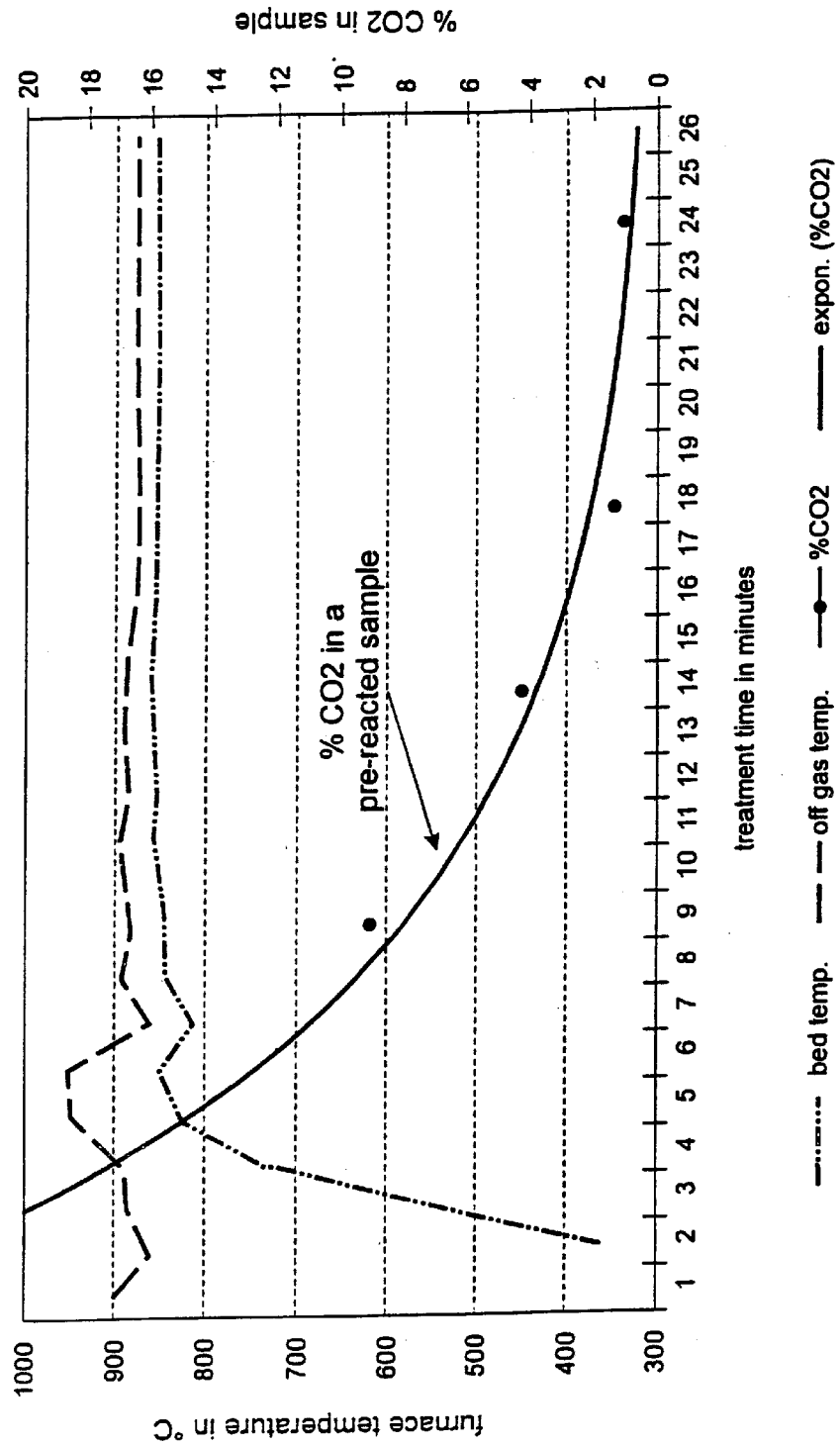

For a molecular system comprising Na—Mg—4Si, seven samples were extracted and analyzed, obtaining the following results, illustrated in FIG. 3:

| Sample # | Min | Initial Lecture | Final Lecture | Initial Final | Factor | % $CaCO_3$ | Factor | % $CO_2$ |
|---|---|---|---|---|---|---|---|---|
| 1 | 0 | 52.6 | 41.8 | 10.8 | 1.1 | 11.88 | 0.43 | 5.11 |
| 2 | 5 | 44.8 | 41.6 | 3.2 | 1.1 | 3.52 | 0.43 | 1.51 |
| 3 | 10 | 37.8 | 35.0 | 2.8 | 1.1 | 3.08 | 0.43 | 1.32 |
| 4 | 15 | 44.6 | 41.6 | 3.0 | 1.1 | 3.30 | 0.43 | 1.42 |
| 5 | 20 | 45.6 | 42.2 | 3.4 | 1.1 | 3.74 | 0.43 | 1.61 |
| 6 | 25 | 32.4 | 31.4 | 1.0 | 1.1 | 1.10 | 0.43 | 0.47 |
| 7 | 30 | 47.4 | 45.4 | 2.0 | 1.1 | 2.20 | 0.43 | 0.95 |

EXAMPLE 4

Figure 4:
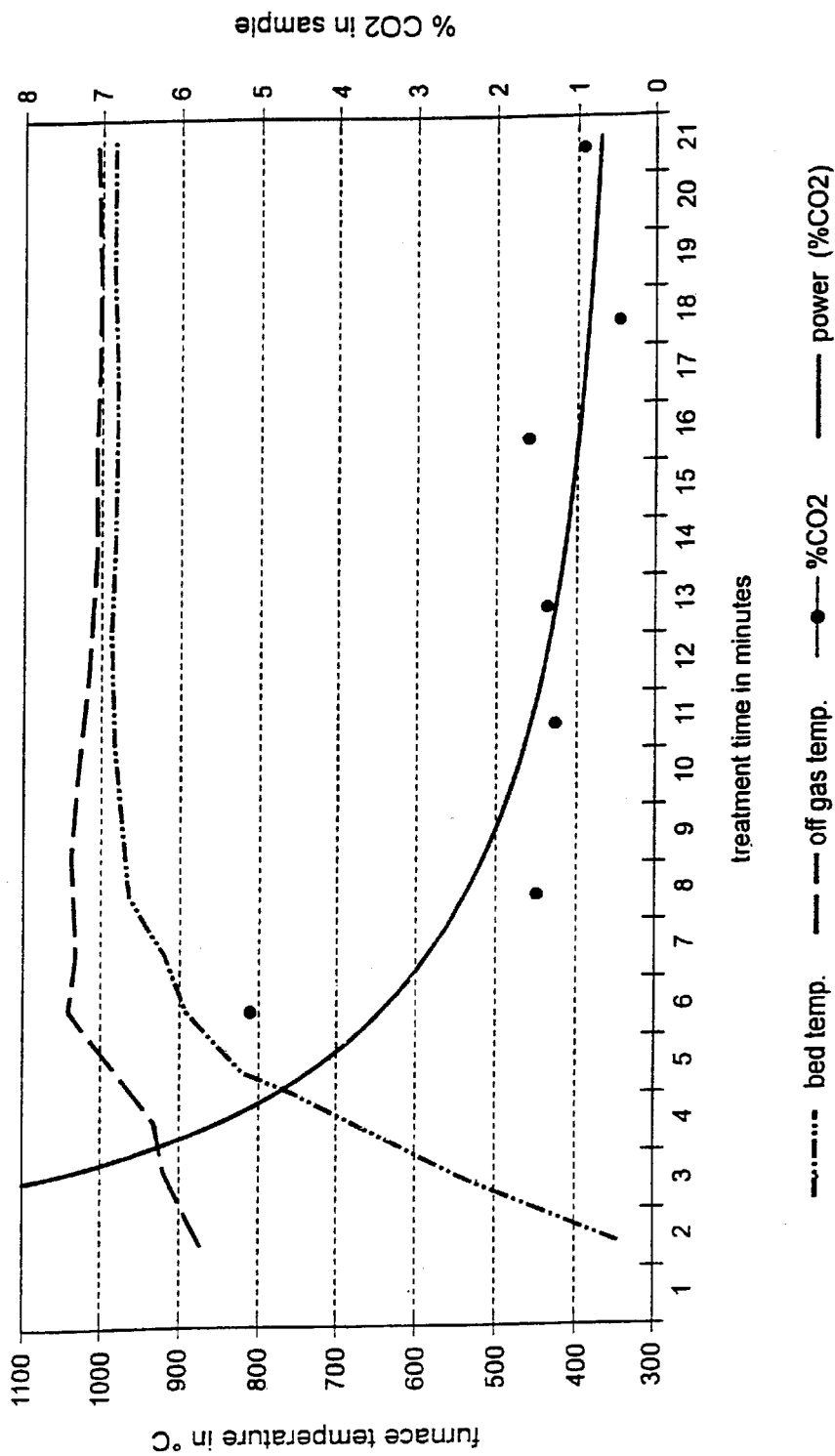

For a molecular system comprising Na—Mg—4Si (foundry silica), nine samples were extracted and analyzed, obtaining the following results illustrated in FIG. 4.

| Sample # | Min. | Initial Lecture | Final Lecture | Inital-Final | Factor | % CaCO$_3$ | Factor | % CO$_2$ |
|---|---|---|---|---|---|---|---|---|
| 1 | 0 | 57.6 | 42.8 | 15.00 | 1.1 | 16.50 | 0.43 | 7.10 |
| 2 | 5 | 64.0 | 44.0 | 20.00 | 1.1 | 22.00 | 0.43 | 9.46 |
| 3 | 10 | 56.4 | 45.8 | 10.60 | 1.1 | 11.66 | 0.43 | 5.01 |
| 4 | 15 | 51.8 | 45.2 | 6.60 | 1.1 | 7.26 | 0.43 | 3.12 |
| 5 | 20 | 45.4 | 43.2 | 2.20 | 1.1 | 2.42 | 0.43 | 1.04 |
| 6 | 25 | 41.8 | 37.8 | 4.00 | 1.1 | 4.40 | 0.43 | 1.89 |
| 7 | 30 | 4S.8 | 3.40 | 3.40 | 1.1 | 3.74 | 0.43 | 1.81 |
| 8 | 35 | 46.0 | 3.24 | 3.20 | 1.1 | 3.52 | 0.43 | 1.51 |
| 9 | 40 | 36.8 | 436.4 | 4.00 | 1.1 | 4.40 | 0.43 | 1.89 |

EXAMPLE 5

Figure 5:
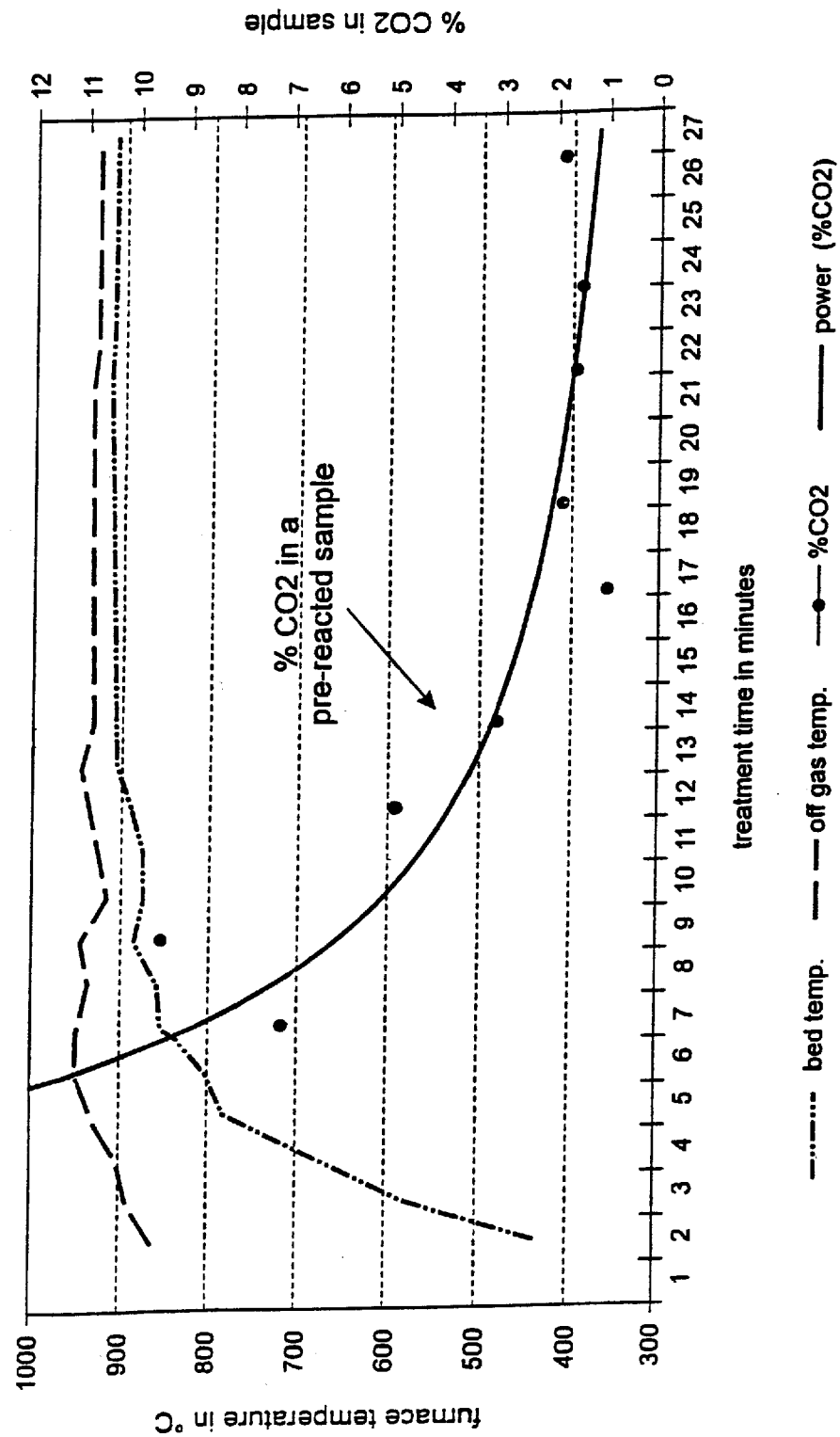

For a molecular system comprising Na—3Ca—6Si, nine samples were extracted and analyzed, obtaining the following results, illustrated in FIG. 5:

| Sample # | Min. | Initial Lecture | Final Lecture | Initial-Final | Factor | % CaCO$_3$ | Factor | % CO$_2$ |
|---|---|---|---|---|---|---|---|---|
| 1 | 5 | 52.4 | 42.4 | 10.0 | 1.1 | 11.00 | 0.43 | 4.73 |
| 2 | 10 | 42.2 | 35.6 | 6.6 | 1.1 | 7.26 | 0.43 | 3.12 |
| 3 | 15 | 48.5 | 46.0 | 2.8 | 1.1 | 3.08 | 0.43 | 1.32 |
| 4 | 20 | 44.6 | 42.4 | 2.2 | 1.1 | 2.42 | 0.43 | 1.04 |
| 5 | 25 | 45.6 | 43.6 | 2.0 | 1.1 | 2.20 | 0.43 | 0.95 |
| 6 | 30 | 41.8 | 39.8 | 2.0 | 1.1 | 2.20 | 0.43 | 0.95 |
| 7 | 35 | 37.6 | 36.0 | 1.6 | 1.1 | 1.76 | 0.43 | 0.76 |
| 8 | 40 | 47.6 | 45.4 | 2.2 | 1.1 | 2.42 | 0.43 | 1.04 |
| 9 | 45 | 42.4 | 40.4 | 2.0 | 1.1 | 2.20 | 0.43 | 0.95 |

EXAMPLE 6

Figure 6:
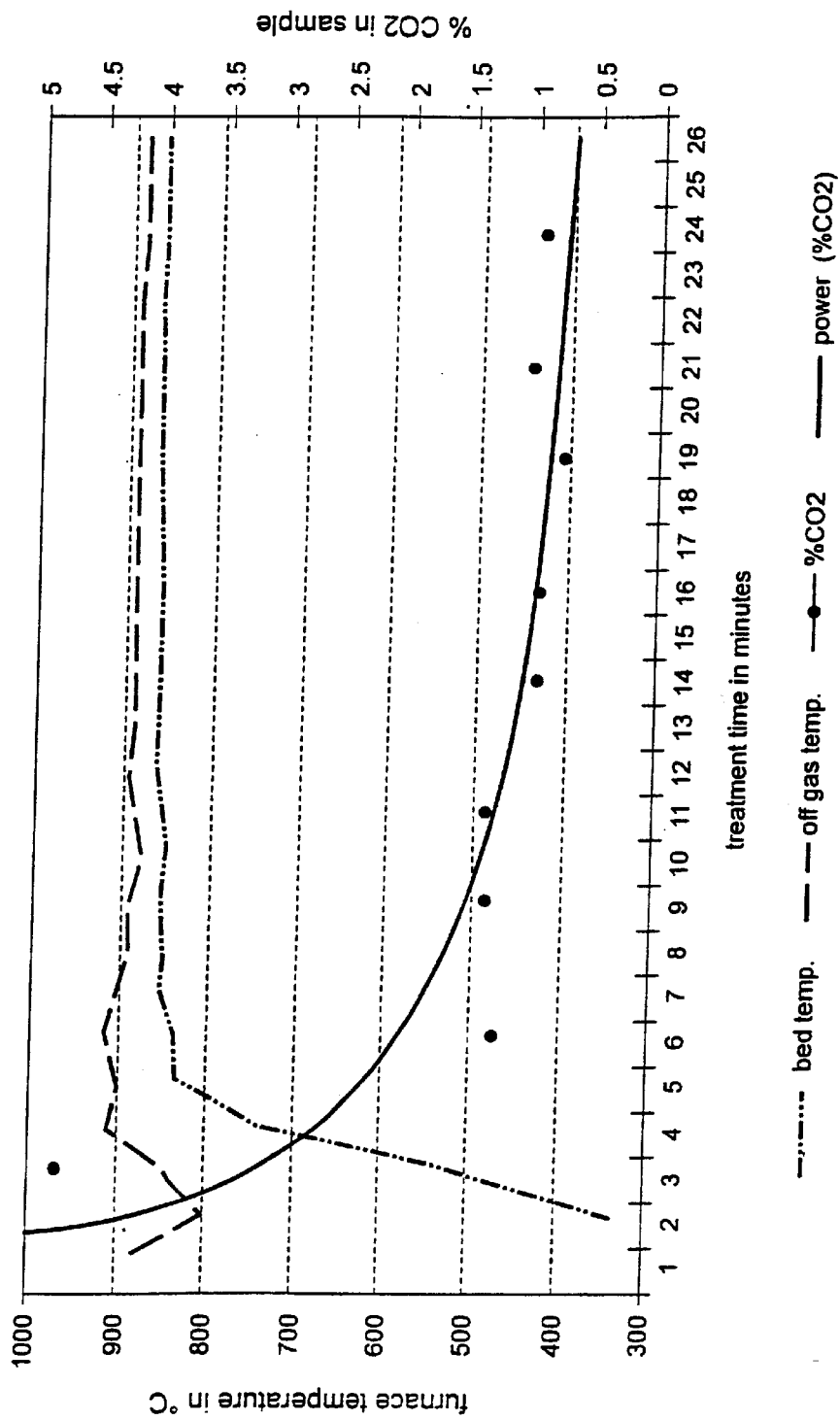

For a molecular system comprising Na—3Ca—6Si (foundry silica), eleven samples were extracted and analyzed, obtaining the following results, illustrated in FIG. 6:

| Sample # | Min. | Initial Lecture | Final Lecture | Initial-Final | Factor | % CaCO$_3$ | Factor | % CO$_2$ |
|---|---|---|---|---|---|---|---|---|
| 1 | 0 | 94.0 | 4.12 | 52.8 | 1.1 | 50.8 | 0.43 | 24.97 |
| 2 | 5 | 72.6 | 36.4 | 36.2 | 1.1 | 39.82 | 0.43 | 17.12 |
| 3 | 10 | 62.2 | 39.8 | 22.4 | 1.1 | 24.64 | 0.43 | 10.60 |
| 4 | 15 | 49.8 | 40.4 | 9.4 | 1.1 | 10.34 | 0.43 | 4.45 |
| 5 | 20 | 44.8 | 39.0 | 5.8 | 1.1 | 6.38 | 0.43 | 2.74 |
| 6 | 25 | 45.0 | 40.4 | 4.6 | 1.1 | 5.06 | 0.43 | 2.18 |
| 7 | 30 | 45.2 | 40.6 | 4.6 | 1.1 | 5.06 | 0.43 | 2.18 |
| 8 | 35 | 49.0 | 44.8 | 4.2 | 1.1 | 4.62 | 0.43 | 1.99 |
| 9 | 40 | 47.6 | 43.0 | 4.6 | 1.1 | 5.08 | 0.43 | 2.18 |
| 10 | 45 | 46.6 | 43.0 | 3.6 | 1.1 | 3.96 | 0.43 | 1.70 |
| 11 | 50 | 46.0 | 42.6 | 3.4 | 1.1 | 3.74 | 0.43 | 1.61 |

EXAMPLES 7 and 8

Figure 7:
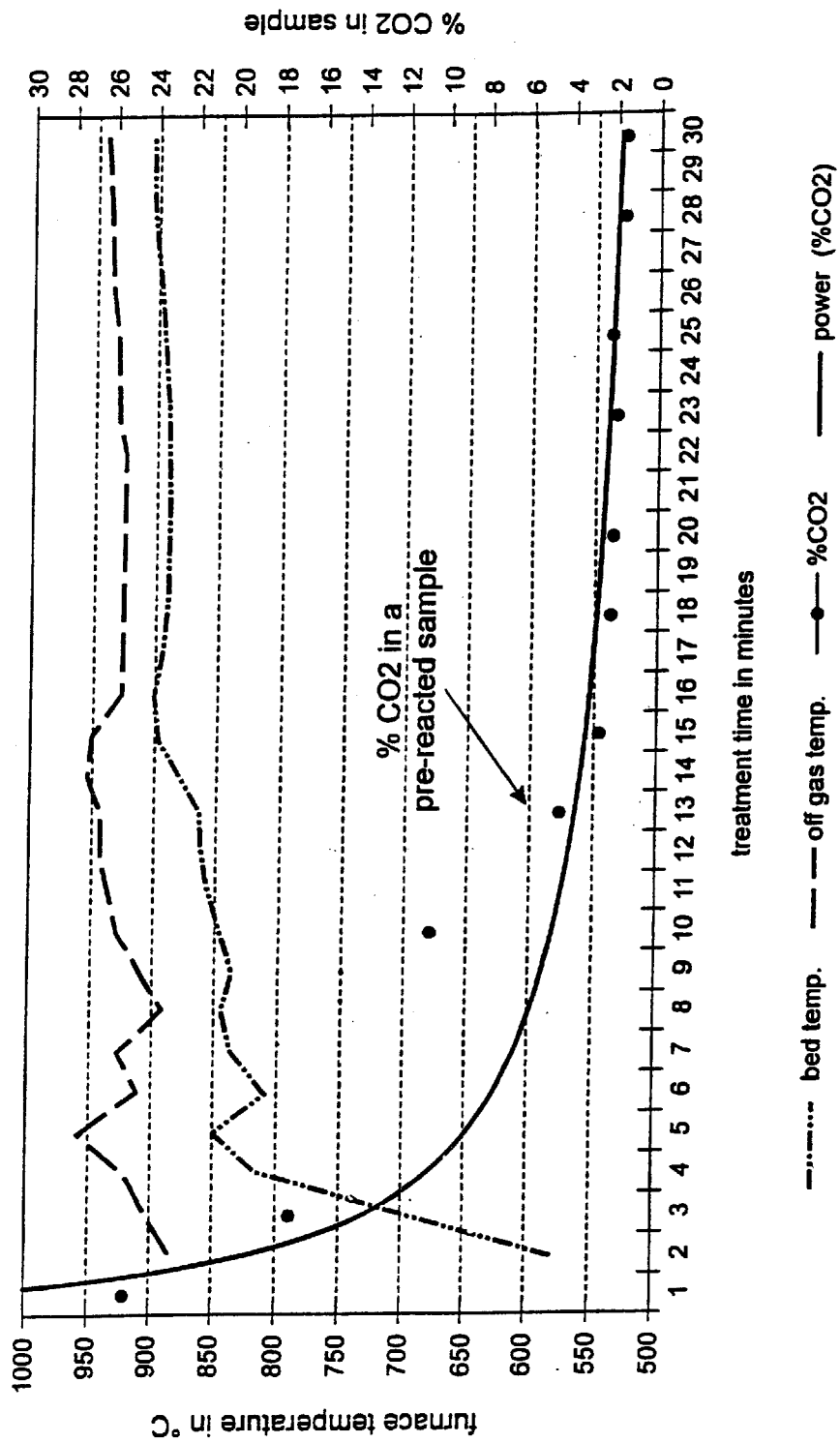
Figure 8:
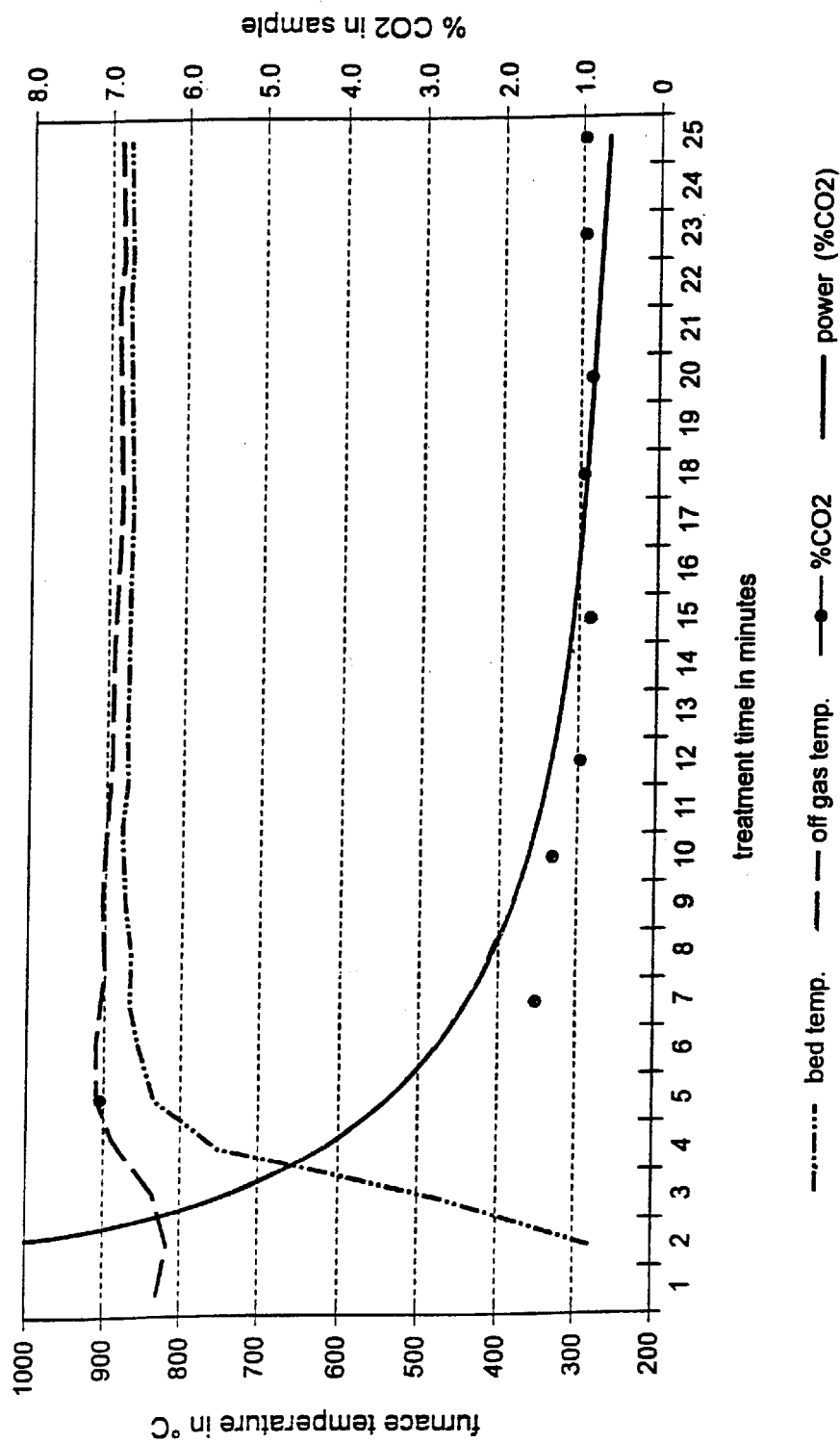

Finally, for molecular systems comprising Na—3Ca—6Si (foundry silica) and Na—2Ca—3Si, eleven and eight samples were extracted and analyzed, obtaining the results illustrated in FIGS. 7 and 8.

What is claimed is:

1. A method for preparing a pre-reacted and carbon dioxide-free synthetic compound for the production of glass formulas, comprising the steps of:
   a) mixing raw materials, minerals, partially treated minerals, intermediate products thereof or compounds, containing molecular systems selected from the group consisting of silica-sodium, silica-sodium-calcium, silica-sodium-magnesium, silica-calcium-magnesium, silica-sodium-calcium-magnesium, and mixtures thereof, in stoichiometric amounts selected from one or more invariant points or points on a line connecting invariant points from a phase diagram; and
   b) calcining the mixture at reaction temperatures which do not form a liquid phase and release $CO_2$ to produce said pre-reacted and carbon dioxide-free synthetic compound that totally saturates the sodium, sodium and calcium, or the sodium, calcium and magnesium of a molecular glass formula.
2. The method according to claim 1, including the further step of adding silica sand to the pre-reacted and carbon dioxide-free synthetic compound to complete the silica content of a glass formula.

* * * * *